US011212961B2

(12) United States Patent
Anderson et al.

(10) Patent No.: US 11,212,961 B2
(45) Date of Patent: Jan. 4, 2022

(54) DRIVE-OVER MOWER DECK WITH RETRACTABLE FRONT ROLLERS

(71) Applicant: Deere & Company, Moline, IL (US)

(72) Inventors: Maxwell G. Anderson, Hartford, WI (US); Travis S. Mergener, Horicon, WI (US)

(73) Assignee: DEERE & COMPANY, Moline, IL (US)

(*) Notice: Subject to any disclaimer, the term of this patent is extended or adjusted under 35 U.S.C. 154(b) by 105 days.

(21) Appl. No.: 16/404,115

(22) Filed: May 6, 2019

(65) Prior Publication Data
US 2020/0352097 A1 Nov. 12, 2020

(51) Int. Cl.
*A01D 34/81* (2006.01)
*A01D 34/66* (2006.01)
*A01D 34/82* (2006.01)
A01D 101/00 (2006.01)
A01D 34/64 (2006.01)

(52) U.S. Cl.
CPC .......... *A01D 34/81* (2013.01); *A01D 34/661* (2013.01); *A01D 34/82* (2013.01); *A01D 2034/645* (2013.01); *A01D 2101/00* (2013.01)

(58) Field of Classification Search
CPC .. A01D 34/81; A01D 34/661; A01D 2101/00; A01D 34/662; A01D 34/64; A01D 34/54; A01D 34/74; A01G 20/35
See application file for complete search history.

(56) References Cited

U.S. PATENT DOCUMENTS

| | | | | |
|---|---|---|---|---|
| 2,734,328 A | * | 2/1956 | Wood | A01D 34/46 56/16.7 |
| 3,654,749 A | * | 4/1972 | Ostergren | A01D 34/63 56/15.8 |
| 3,706,186 A | * | 12/1972 | Hurlburt | A01D 34/74 56/15.8 |
| 4,325,211 A | | 4/1982 | Witt et al. | |
| 5,280,695 A | | 1/1994 | Nunes, Jr. et al. | |
| 5,355,665 A | | 10/1994 | Peter | |
| 5,481,857 A | * | 1/1996 | Umemoto | A01D 34/81 56/12.6 |
| 5,528,889 A | * | 6/1996 | Kure | A01D 34/64 56/15.6 |
| 5,870,888 A | * | 2/1999 | Pugh | A01D 34/001 56/16.7 |
| 6,041,584 A | | 3/2000 | Hohnl | |
| 6,523,335 B2 | * | 2/2003 | Vanderipe | A01D 34/001 56/16.7 |
| 6,546,707 B2 | * | 4/2003 | Man | A01D 34/661 56/15.2 |

(Continued)

FOREIGN PATENT DOCUMENTS

| | | | | | |
|---|---|---|---|---|---|
| JP | 2014143991 A | * | 8/2014 | ............. | A01D 34/64 |
| WO | WO-2018060500 A1 | * | 4/2018 | ........... | A01D 34/695 |

*Primary Examiner* — Alicia Torres
*Assistant Examiner* — Madeline Ivy Runco

(57) ABSTRACT

A drive-over mower deck includes at least one retractable front roller which is pivotable between a lowered position extending forwardly and downwardly from a rim at a front and center of the drive-over mower deck, and a retractable position in which the front roller pivots freely between the lowered position and a retracted position when the drive-over mower deck lays flat on a ground surface.

14 Claims, 3 Drawing Sheets

(56) References Cited

U.S. PATENT DOCUMENTS

| | | | |
|---|---|---|---|
| 6,584,756 B2 * | 7/2003 | Buss | A01D 34/64 |
| | | | 56/15.6 |
| 6,698,172 B2 | 3/2004 | Ferris et al. | |
| 6,912,833 B2 * | 7/2005 | Buss | A01D 34/64 |
| | | | 56/15.6 |
| 7,240,470 B2 * | 7/2007 | Clement | A01D 34/64 |
| | | | 56/17.2 |
| 7,600,363 B2 | 10/2009 | Porter et al. | |
| 7,631,477 B2 * | 12/2009 | Eavenson, Sr. | A01D 43/00 |
| | | | 56/1 |
| 7,685,800 B2 | 3/2010 | Sugio et al. | |
| 7,735,306 B2 * | 6/2010 | Kure | A01D 34/71 |
| | | | 56/320.1 |
| 7,877,972 B2 | 2/2011 | Fox et al. | |
| 7,905,297 B2 | 3/2011 | Fox et al. | |
| 8,099,938 B2 * | 1/2012 | Kure | A01D 34/71 |
| | | | 56/320.2 |
| 8,112,976 B1 * | 2/2012 | Kallevig | A01D 43/00 |
| | | | 56/17.4 |
| 8,234,847 B2 | 8/2012 | Fox et al. | |
| 8,336,281 B2 | 12/2012 | Sugio et al. | |
| 8,720,173 B2 | 5/2014 | Sugio et al. | |
| 9,622,406 B2 | 4/2017 | Tada et al. | |
| 2010/0314145 A1 * | 12/2010 | Merkt | A01B 73/00 |
| | | | 172/610 |
| 2017/0020068 A1 | 1/2017 | Ressler et al. | |
| 2019/0037768 A1 * | 2/2019 | Brunner | A01D 34/74 |
| 2019/0124836 A1 * | 5/2019 | Aposhian | A01D 34/74 |
| 2020/0022306 A1 * | 1/2020 | Meyer | A01D 43/02 |

* cited by examiner

DRIVE-OVER MOWER DECK WITH RETRACTABLE FRONT ROLLERS

FIELD OF THE INVENTION

This invention relates generally to rotary mower decks carried by tractors or other vehicles. More specifically, the invention relates to a drive-over mower deck with retractable front rollers.

BACKGROUND OF THE INVENTION

Drive-over mower decks help reduce the time and effort required to install or remove a mid-mounted mower deck from under the tractor or other vehicle. For example, U.S. Pat. No. 7,240,470 for Drive over mower deck, assigned to Deere & Company, relates to a mower deck with drive-over belt shields on the top surface of the deck, and retractable gauge wheels at the front and rear edges on the left and right sides of the mower deck. The height of the gauge wheels may be adjusted, and the gauge wheels also may be retracted sufficiently so that the mower deck rests on the ground surface when the tractor or vehicle drives over it. U.S. Pat. No. 7,877,972 for Automatic connection mechanism for mid-mounted implement, assigned to Deere & Company, shows a drive-over mower deck having a front lift linkage, along with rear lift linkage, to provide a four point parallelogram lift arrangement for automatically connecting the drive-over mower deck to a tractor or other vehicle.

Additionally, one or more front rollers may be mounted at the front and center of the drive-over mower deck, to reduce or prevent scalping by the front mower blade when mowing grass mounds or small hills. There is a need for a drive-over mower deck with front rollers that may be retractable easily when the deck is on the ground so that a tractor or other vehicle may drive over the mower deck, and may be lowered and extended to prevent scalping when mowing.

SUMMARY OF THE INVENTION

A drive-over mower deck includes a roller pivot bracket supporting one or more retractable front rollers at a front and center position of a drive-over mower deck. A front linkage is pivotably connectable between the drive-over mower deck and a tractor. The front linkage contacts the roller pivot bracket, forcing the roller pivot bracket from a retractable position to an extended position in which the front rollers extend lower than a lower rim of the mower deck to prevent scalping.

DESCRIPTION OF THE PREFERRED EMBODIMENT

Figure 1:
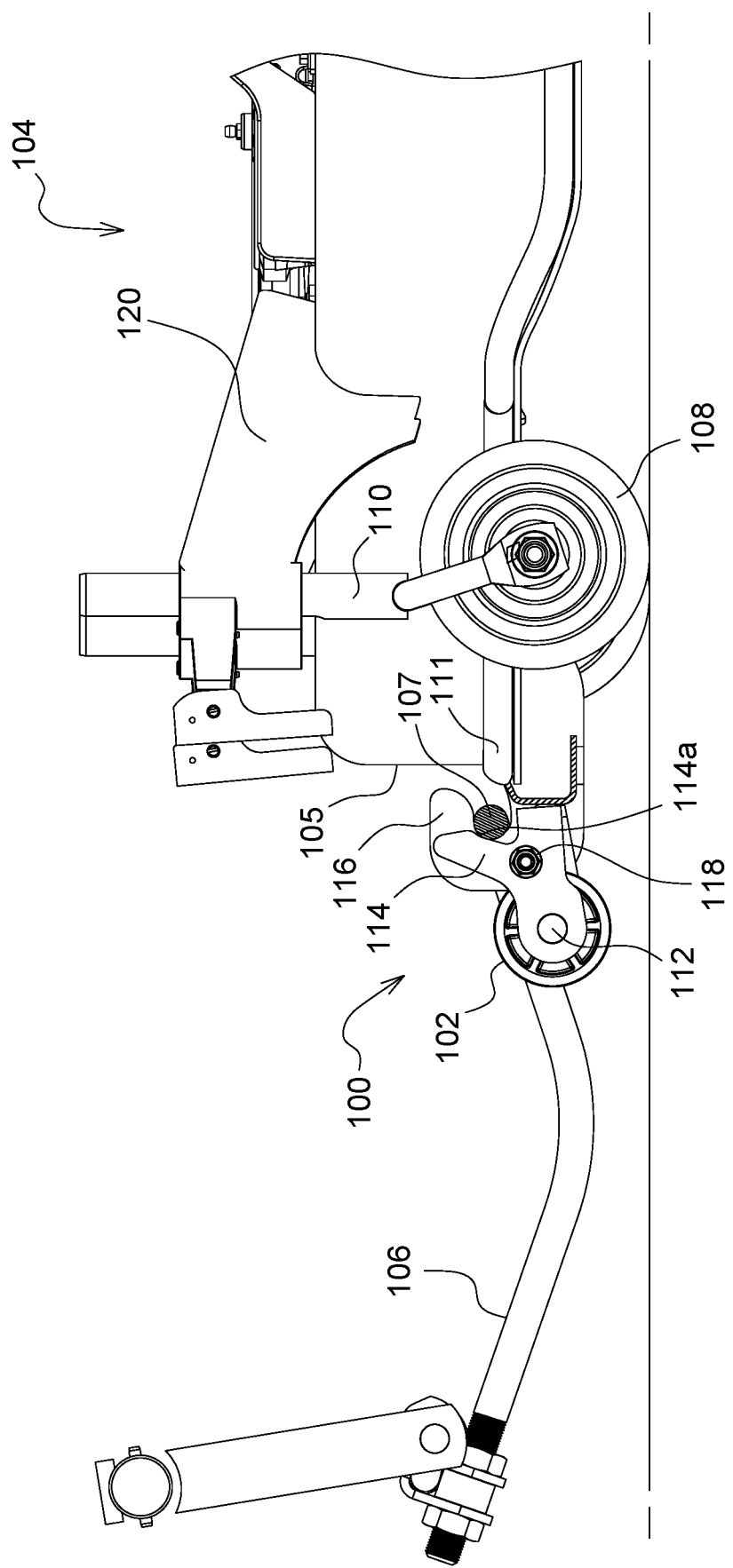
FIG. 1 is a side view of a drive-over mower deck with retractable front rollers in a lowered, extended position according to a first embodiment of the invention.
Figure 2:
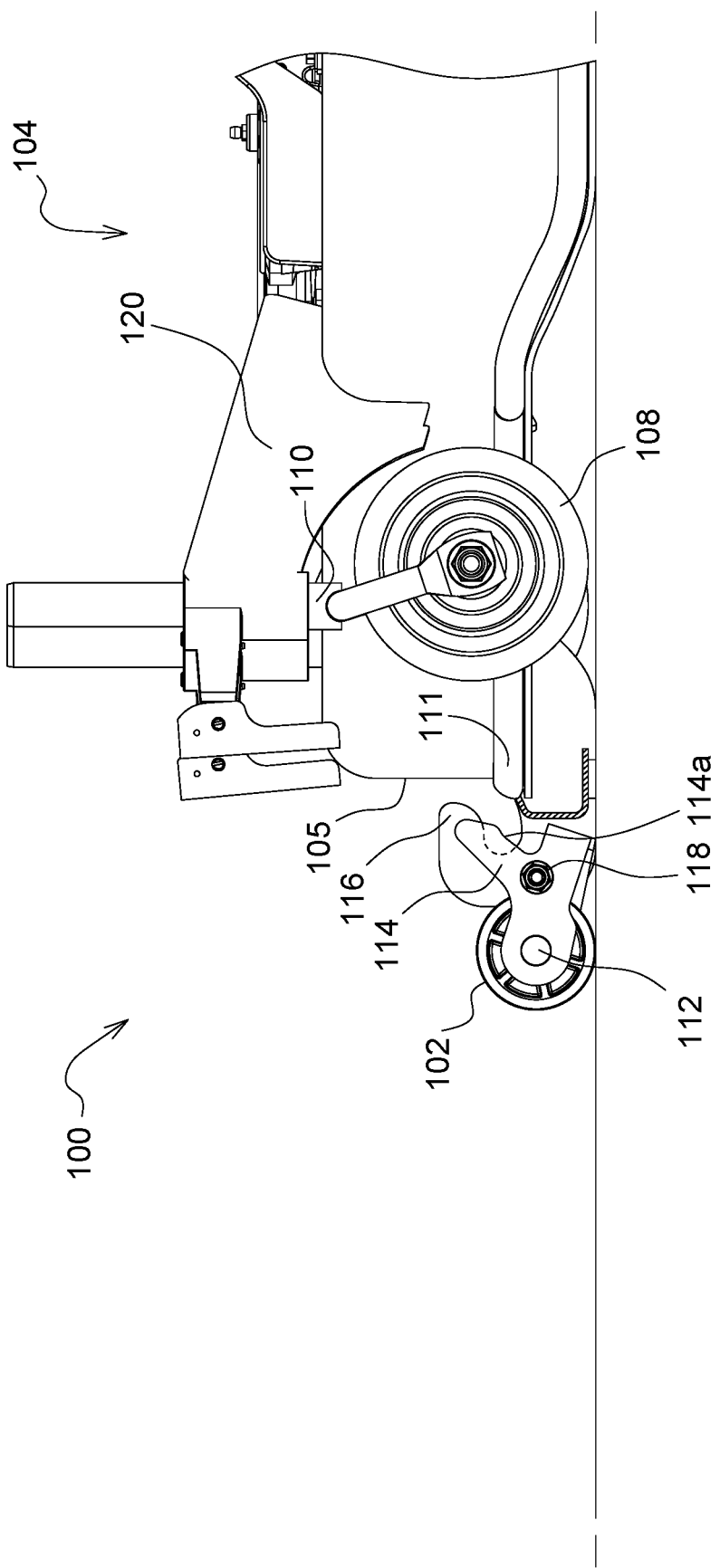
FIG. 2 is a side view of a drive-over mower deck with retractable front rollers in a retractable position according to a first embodiment of the invention.
Figure 3:
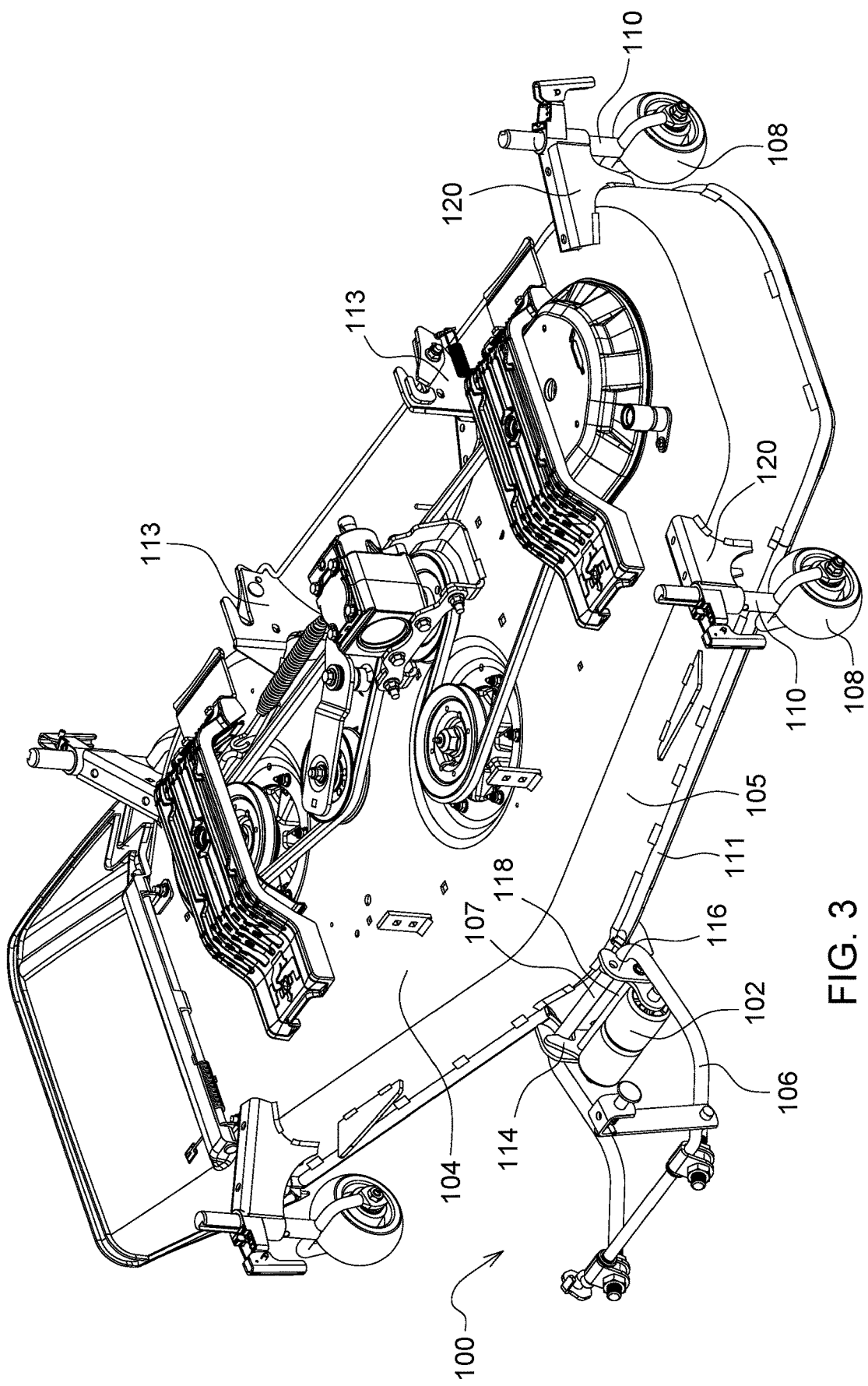
FIG. 3 is a top perspective view of a drive-over mower deck with retractable front rollers according to a first embodiment of the invention.

FIGS. 1-3 show a preferred embodiment of drive-over mower deck with retractable front rollers 100. Drive-over mower deck 104 may have side skirts 105 extending down from the deck's horizontal top surface to lower rim 111. The drive-over mower deck may house three rotary cutting blades, with the center blade positioned forwardly of the left and right blades. One or more retractable front rollers are intended to help prevent scalping by the front mower blade, especially when mowing grass mounds or small radius hills, but are retractable above the ground surface when the mower deck lays flat on the ground, especially when driving over the deck to connect or disconnect the deck from the tractor or other vehicle.

In one embodiment, drive-over mower deck with retractable front rollers 100 may include one or more front rollers 102 that are cylindrical and positioned side-by-side at the front and center of the deck. The rollers may rotate on roller shaft 112. Each end of roller shaft 112 may be supported by roller pivot bracket 114, which may pivot on pivot axis 118 that is horizontal and parallel to roller shaft 112. Roller pivot bracket 114 may pivot between a lowered, extended position as shown in FIG. 1, and a retracted position as shown in FIG. 2. The lowered, extended position may be a fixed position below the lower rim 111 of the drive-over mower deck, so the retractable front rollers can reduce or prevent scalping by the front mower blade. The rollers may be retractable to a position at or above the lower rim of the drive-over mower deck, so that the mower deck may lay on the ground in a drive-over position.

In one embodiment, drive-over mower deck with retractable front rollers 100 may include front lift linkage 106, along with a rear lift linkage, to provide a four point parallelogram lift arrangement for the drive-over mower deck. The rear lift linkage may be substantially as shown in U.S. Pat. No. 7,877,972, and may be automatically connected to rear-facing hooks 113 on the rear of the drive-over mower deck. Using the front and rear lift linkages, the drive-over mower deck may be releasably connected to a tractor or other vehicle after the deck is straddled between the tractor's front and rear wheels, and preferably after the tractor's front wheels drive over the deck. After the drive-over mower deck is positioned between the front and rear wheels, the operator may attach front lift linkage 106 to the drive-over mower deck, by engaging the front linkage to front hooks 116 on the deck, and to front hangers on the tractor or other vehicle.

In one embodiment, drive-over mower deck with retractable front rollers 100 may include front lift linkage 106 that is pivotably attachable to the forward end of the drive-over mower deck. When the front lift linkage is attached to the mower deck, the front lift linkage may force the front rollers to the lowered, extended position. For example, front lift linkage 106 may be a front draft rod that engages rear-facing front hooks 116 on the front and center of drive-over mower deck 104. For example, the front hooks may be mounted below skirt 105 and to lower rim 111 at the front and center of the deck. The front draft rod may be a U-shaped bar that connects the front of the drive-over mower deck to front hangers on a tractor or other vehicle. The front draft rod may have a base portion 107 which loops around and into the front hooks. When the front draft rod enters the front hooks, the base portion of the front draft rod may contact cam surface 114a of roller pivot bracket 114. The cam surface may be a rear facing surface that extends upwardly and rearwardly on roller pivot bracket 114. As the front draft rod is pulled forward, the base portion of the front draft rod may push the cam surface forward, causing the roller pivot bracket to pivot on axis 118. As a result, the retractable front rollers may be forced to move to the lowered, extended position. When the front draft rod is removed and disconnected from the front hooks, the base portion of the front draft rod moves out of contact with the cam surface 114a of roller pivot bracket 114, so the front rollers may return to the retractable position.

In one embodiment, drive-over mower deck with retractable front rollers 100 has front rollers 102 supported by roller pivot bracket 114 that may freely pivot up or down on pivot axis 118 when in the retractable position. More specifically, when the front lift linkage, such as the front draft rod, is removed from the mower deck, the front rollers may be free to retract when they contact the ground with the mower deck in the drive-over position. Thus, in the retractable position, the rollers may not be at a fixed height or position. Additionally, the drive-over mower deck with retractable front rollers does not require a biasing mechanism or height adjustment device to move the front rollers up or down when they are in the retractable position, or to move between the lowered or extended position and the retractable position.

In one embodiment, drive-over mower deck with retractable front rollers 100 may have gauge wheels 108 positioned at the front and back of the mower deck, adjacent each side of the deck. For example, each gauge wheel may be supported by a vertically aligned shaft 110. A cam lever may be used to assist in engagement or disengagement of a gauge wheel pin through shaft 110. Each shaft may slide in a gauge wheel bracket 120 attached to the front or back of the deck on the left and right sides of the deck. In the drive-over position, the operator may position the gauge wheels above the rim so the deck may lay flat on the ground.

Having described the preferred embodiment, it will become apparent that various modifications can be made without departing from the scope of the invention as defined in the accompanying claims.

The invention claimed is:

1. A drive-over mower deck comprising:
   a roller pivot bracket supporting at least one retractable front roller at a front and center position of the drive-over mower deck; and
   a front linkage pivotably connectable between the drive-over mower deck and a tractor, the front linkage contacting the roller pivot bracket and forcing the roller pivot bracket from a retractable position so the front of the mower deck is on a ground surface to an extended position in which the front roller extends lower than a lower rim of the mower deck supporting the front of the mower deck in a mowing position.

2. The drive-over mower deck of claim 1 wherein the front linkage is a front draft rod that is pivotably connected to at least one hook on the drive-over mower deck.

3. The drive-over mower deck of claim 1 wherein, in the retractable position the bracket and the front roller are freely pivotable from the extended position to a drive over position above the lower rim of the mower deck.

4. The drive-over mower deck of claim 1 wherein the font lift linkage is part of a four point parallelogram lift arrangement for the drive-over mower deck.

5. A drive-over mower deck, comprising:
   a front roller on the drive-over mower deck;
   the front roller pivotable between a lowered position extending forwardly and downwardly from a rim at a front and center of the drive-over mower deck wherein a front linkage engages the mower deck, and a retractable position wherein the front linkage is disengaged from the mower deck in which the front roller pivots freely between the lowered position and a drive over position when the drive-over mower deck lays flat on a ground surface.

6. The drive-over mower deck of claim 5, further comprising a roller pivot bracket supporting the front roller.

7. The drive-over mower deck of claim 6 wherein the roller pivot bracket is pivotable relative to the front and center of the drive-over mower deck.

8. The drive-over mower deck of claim 7 further comprising a rearwardly facing cam surface on the roller pivot bracket.

9. The drive-over mower deck of claim 8 wherein the front lift linkage contacts the cam surface on the roller pivot bracket to urge the roller pivot bracket from the retractable position to the lowered, extended position.

10. A drive-over mower deck, comprising:
    a front lift linkage between the drive-over mower deck and a tractor;
    the front lift linkage including a base portion which loops around and into a pair of rear-facing front hooks on a front and center of the drive-over mower deck;
    the base portion contacting a cam surface of a roller pivot bracket supporting at least one front roller and pushing the cam surface forward to cause the roller pivot bracket and the front roller to move from a retractable position wherein the mower deck is on a ground surface to a lowered, extended position wherein the mower deck is at a cutting position.

11. The drive-over mower deck of claim 10 wherein the roller pivot bracket and the front roller are fixed in the lowered, extended position while the base portion engages the pair of front hooks.

12. The drive-over mower deck of claim 10 wherein the roller pivot bracket and the front roller are freely pivotable in the retractable position.

13. The drive-over mower deck of claim 10 wherein the front roller is pivotable above a lower rim of the drive-over mower deck in the retractable position.

14. The drive-over mower deck of claim 10 wherein the front roller is fixed below a lower rim of the mower deck in the lowered, extended position.

* * * * *